United States Patent
Lin et al.

(10) Patent No.: US 6,340,720 B1
(45) Date of Patent: Jan. 22, 2002

(54) PROCESS FOR MAKING POLYVINYLIDENE FLUORIDE POWER COATINGS AND COATING FORMULATIONS

(75) Inventors: Shiow-Ching Lin, Lawrenceville; Michelle Kelly, Mantua; Bradley Kent, Sicklerville, all of NJ (US)

(73) Assignee: Ausimont USA, Inc., Thorofare, NJ (US)

( * ) Notice: Subject to any disclaimer, the term of this patent is extended or adjusted under 35 U.S.C. 154(b) by 0 days.

(21) Appl. No.: 09/503,968

(22) Filed: Feb. 14, 2000

(51) Int. Cl.$^7$ .............................. C08J 3/16; C08L 27/16; B05D 1/02; C08K 3/24; C08K 3/28
(52) U.S. Cl. ..................... 523/335; 524/422; 524/429; 524/904; 524/567; 525/934; 427/458; 427/459
(58) Field of Search .................... 523/335; 524/464, 524/904, 567, 422; 525/934; 427/458, 459

(56) References Cited

U.S. PATENT DOCUMENTS

| | | |
|---|---|---|
| 3,824,115 A | 7/1974 | Segawa et al. |
| 4,185,000 A | 1/1980 | Gebauer et al. |
| 4,391,763 A | 7/1983 | Ueno et al. |
| 4,579,906 A | 4/1986 | Zabrocki et al. |
| 4,770,939 A | 9/1988 | Sietses et al. |
| 5,082,616 A | 1/1992 | White et al. |
| 5,229,460 A | 7/1993 | Yousuf et al. |
| 5,346,727 A | 9/1994 | Simkin |
| 5,739,202 A | 4/1998 | Pecsok |
| 5,827,608 A | 10/1998 | Rinehart et al. |
| 6,040,370 A | 3/2000 | Wozny et al. |

FOREIGN PATENT DOCUMENTS

| | | |
|---|---|---|
| EP | 0 284 996 | 5/1988 |
| WO | WO99/01505 | 1/1999 |
| WO | WO99/03900 | 1/1999 |

*Primary Examiner*—Tae H. Yoon
(74) *Attorney, Agent, or Firm*—Norris, McLaughlin & Marcus

(57) ABSTRACT

A process for making a PVDF-based powder coating compositions using a co-coagulation process and compositions comprising co-coagulated PVDF, co-coagulated PVDF-based powder coating compositions and substances coated with these compositions. Vinylidene fluoride polymer latex compositions are mixed with compatible thermoplastic polymer latex, such as acrylic polymer latex, and a coagulant is added. The coagulant precipitates the vinylidene fluoride and polymer, and the precipitant is filtered and dried forming the powder coating. The powder coating is homogenous. The coating comprises no solvents and can be applied to a number of substrates.

22 Claims, No Drawings

US 6,340,720 B1

PROCESS FOR MAKING POLYVINYLIDENE FLUORIDE POWER COATINGS AND COATING FORMULATIONS

BACKGROUND OF THE INVENTION

1. Field of the Invention

The invention concerns powder coating comprising polyvinylidene fluoride ("PVDF"), and in particular, a co-coagulation process for making powder coating compositions comprising PVDF. PVDF is a very important raw material for coating compositions based largely on ultraviolet ("UV") light transparency. PVDF, for example, provides long term protection for metal surfaces against exterior exposure, much better than other known organic coating materials. In order to balance the performance of PVDF coatings, a secondary resin normally is needed to provide good adhesion to substrate, to reduce the shrinkage of the polyvinylidene fluoride due to excess crystallization, to increase the dispersability of a pigment in a coating and to obtain good optical properties. Thermoplastic polymers, such as acrylic polymers, can be used in the invention as a secondary resin for the PVDF-based powder coating compositions made from the co-coagulation process.

The process involves the co-coagulation of a blend comprising PVDF latex and a thermoplastic polymer latex, such as an acrylic polymer latex, to produce a PVDF-based powder coating that can be applied to a substrate. The co-coagulation process is less expensive and less time consuming than other processes and provides a coating composition that has a higher amount of homogeneity. Homogeneous coating compositions, including those in the form of a powder, are preferred because the higher degree of homogeneity in a coating blend provides for better performance, such as better coating properties, hardness, adhesion to substrate, and abrasion and mar resistance.

Industrial and commercial users of coating compositions, as well as the general public, have increasingly demanded coating preparations and paints with reduced or no volatile organic content ("VOC"). VOC is a concern to industrial and commercial applicators of paint and coating compositions, as well as the general public, because of the health risks that have been associated with VOC in coatings and paints. Also, industrial and commercial users prefer coating compositions with little or no VOC because of disposal and waste concerns that arise with material having VOC. Thus, there is consumer demand for high quality and weather or corrosive resistant coating materials that can be applied without the use of solvents, such as powder coatings including PVDF-based powder coatings.

2. The Related Art

Polyester powder coatings have been traditionally used for outdoor applications and such coatings have evolved to triglycidylisocyanuarate and, recently, superpolyesters. However, these polyester coatings tend to undergo photo-oxidation and hydrolysis when used as exterior protective coatings, and do not meet the highest performance standards. PVDF coatings have better weather resistance than polyesters. PVDF has been used in architectural coating formulations since early 1960, and is demonstrated to be a long lasting protective and decorative coating for outdoor applications. In binder matrix, PVDF based coating compositions usually contain 70 weight percent of PVDF and 30 weight percent of a secondary polymer. Pigments may be added for decorative purpose.

Commercial PVDF paints are generally solvent dispersions and release solvent during coating preparation. The solvent emission is currently managed by the end user through the installation and operation of an incineration system in a coating line. The incinerator will burn the VOC of the solvent emission to reduce or preclude harmful emission of VOC to the atmosphere. The need for an incinerator is, generally, a regulatory requirement. Thus, PVDF based paints in a solvent dispersion will require the end user to invest capital to install air pollution control apparatus, such as an incinerator, and incur costs to maintain the equipment and comply with regulatory requirements. These costs can be avoided by the use of solvent free coatings, such as PVDF-based powder coating preparations.

PVDF-based powder coatings wherein PVDF is mixed with at least one inorganic coating, such as silica sand and glass spheres, are described in U.S. Pat. No. 3,824,115 and U.S. Pat. No. 4,185,000. The methods for making these coating compositions do not involve co-coagulation. The powder coating compositions described in these patents result in a product having non-uniform color when applied to a substrate, due to the separation of the particles in the composition, because the particles within the powder coating composition have different densities. Also, the pigment is not well wetted by the resin and, thus, does not produce a coating having desired long-term weatherability. U.S. Pat. No. 4,391,763 discusses PVDF powder having spherical particles suitable for powder coating application. The coatings described in this patent lack homogeneity, which is a concern with this approach to obtaining PVDF-based powder coating compositions.

PVDF-based powder coating compositions can be made by cryogenic grinding methods. U.S. Pat. No. 4,770,939 describes a process comprising mixing pigment with PVDF and a compatible thermoplastic using an extruder at melt condition, pelletizing the resulting extrudate, and cryogenically grinding the pellets. European Patent 284,996 uses the same process to produce PVDF powder coatings containing solid coalescent to improve flow characteristics during a baking process. U.S. Pat. No. 5,346,727 discusses the use of low molecular weight PVDF and its copolymer to produce powder coating using cryogenic grinding processes. Cryogenic powder fabrication processes require large energy consumption for extrusion and pelletization. The cryogenic grinding step requires a large quantity of liquid nitrogen as coolant. Thus, cryogenic processes tend to be expensive and difficult to manage, and not as well suited for large scale manufacturing as other processes, including the co-coagulation process described herein. Cryogenic grinding processes can generally be characterized as time consuming and costly.

U.S. Pat. No. 5,229,460 describes a grinding process that does not involve cryogenic processing at about −50° C. The process involves mixing and heating fluoropolymer, such as, PVDF, and other ingredients in an extruder. The molten mixture is then cooled slowly to obtain a solid mass having a high degree of crystallinity to reduce the toughness of the solid mixture. Because of the high degree of crystallinity, the solid mass can be ground to powder at a temperature above −50° C. The solid mass may also comprise a terpolymer of three monomers. This process tends to be time consuming and costly, and requires energy expenditures to obtain a molten PVDF mixture.

A method for making a pigmented PVDF powder coating using a solvent removal process, but without coagulation of a polymer latex mixture, is described in U.S. Pat. No. 5,739,202. The method involves solvent dissolution of a fluorine-free polymer and then dispersing a PVDF polymer and pigments in the solution. Solvent removal and grinding is required to obtain the powder coating product.

A process for making a powder composed of a poly (meth)acrylate and fluoropolymer involving steps of (1) mixing together a water based latex of a first polymer and a water-based latex of a second polymer; (2) spray drying the mixture of step (1) to form substantially spherical particles; and (3) optionally passing the particles through a sieve was recently described in U.S. Pat. No. 5,827,608. This process does not involve co-coagulation of polymer latex to achieve a desired product, and is quite expansive from the viewpoint of water removal.

It has now been found that powder coatings comprising PVDF which are homogeneous and exhibit superior mechanical and physical properties, and exemplary performance, can be made by a co-coagulation method. This method involves co-coagulation of a latex mixture comprising polyvinylidene fluoride (or copolyvinylidene fluoride) latex and a compatible thermoplastic latex with, optionally, additives including pigments. The co-coagulation process precipitates the desired homogeneous solid blend. After solid separation and spray drying, a powder suitable for powder coating is produced. To produce color coating, pigment can be uniformly dispersed into latex, optionally, using a grinding aid, before co-coagulation takes place.

The co-coagulation method has several advantages over other methods for obtaining PVDF powder coatings, including less expense and time, particularly compared to cryogenic and other grinding processes, and there is no need for solvents and only minimal need for water removal during the process because the co-coagulated mass precipitates from solution. Thus, the process described herein produces a homogeneous powder coating that has exemplary performance properties with less time, expense and capital than other known processes.

Powder based coatings are preferred by the end user because they lack VOC and, thereby, avoid the special requirements that arise because of VOC when using solvent based coating preparations. The lack of VOC further reduces application costs because environmental controls for VOC, such as an incinerator, are not necessary and chemical waste considerations associated with wet spray and solvents with VOC are eliminated by powder based coatings. Several other advantages, such as those discussed below, can be realized with use of powder coating materials. Powders can be sold and shipped in a ready to use state thereby obviating any need by the end user for mixing, stirring or thinning during application. Powder based coatings can be used more efficiently than wet spray paint and the powder coatings have a higher percentage usage because the powder can be recycled during coating operations. The high raw material utilization associated with powder coating arises from the lack of any solvent requirement for application. Also, because the powder has no VOC there is significantly reduced absorption of energy during film forming on a substrate after application thereby resulting in energy savings by the end user during application. These, and other, advantages of PVDF-based powder coating compositions result in consumer and industrial demand for such coating products.

All percentages set forth herein are, unless otherwise noted, weight by weight percent.

SUMMARY OF THE INVENTION

The invention concerns a co-coagulation process to produce PVDF powder coatings, specifically the co-coagulation of a latex mixture comprising PVDF latex and a compatible thermoplastic polymer latex, such as an acrylic polymer latex, to produce PVDF-based powder coatings. The polymer in the compatible thermoplastic polymer latex is miscible with PVDF after the coating process. The PVDF can be a homopolymer or a copolymer of vinylidene fluoride. The PVDF powder coating composition can be obtained by separating the co-coagulated latex mixture from water and, then, by spray drying to solid powder product. Pigments, binders, grinding aids and other additives can be added during the co-coagulation process.

The invention also concerns the PVDF powder coatings made from the co-coagulation process described herein. The powder coatings provide a coating composition that has a high degree of homogeneity and, thus, better coating performance properties, including hardness, adhesion to substrate, and abrasion and mar resistance compared to other powder coating compositions made by other processes. The invention further concerns substrates coated with the PVDF powder coatings from the co-coagulation process.

DETAILED DESCRIPTION OF THE INVENTION

The term PVDF as used in the Specification pertains to homopolymers of vinylidene fluoride and, copolymers comprising PVDF and other fluoropolymers, including a copolymer of more than about 80% vinylidene fluoride and up to about 20% hexafluoropropylene. PVDF coating compositions can be used for coating a large variety of substrates, including metal and plastics, and has wide acceptance as an architectural coating due to the properties of PVDF, including high crystallinity and photo-oxidative resistance, which provide for coatings that are weather resistant and stand up to corrosive or other harsh environments. In order to balance the performance of PVDF, a secondary resin normally is needed to provide good adhesion to substrate, to reduce the shrinkage of the polyvinylidene fluoride due to excess crystallization, to increase the dispersability of a pigment in a coating and to obtain good optical properties. Thermoplastic polymers, such as acrylic polymers, including polyalkyl methacrylate, are considered to be good secondary resins to balance the performance of the PVDF in the coating.

PVDF is miscible with a wide range of polymers such as polymethacrylates, polyacrylates and polyvinyl acetates containing C=O groups in the ester, amide or ketone forms. The miscibility, in part, arises from the interaction between the C=O bonds of the polymethacrylates, polyacrylates and polyvinyl acetates, as the case may be, and the $CH_2$ groups of the vinylidene fluoride. Particularly useful secondary polymers for PVDF coating applications, including coatings made by the co-coagulation method described herein, are polyalkyl methacrylates, including the homopolymer of methyl methacrylate, polymethyl methacrylate ("PMMA"), or copolymers of more than about 65% methyl methacrylate and up to about 35% ethyl methacrylate or butyl methacrylate. The coating compositions made from the co-coagulation process 10 described herein preferably comprise from about 50% to about 90% PVDF and from about 10% to about 50% polyalkyl methacrylate. Poly(ethyl acrylate), poly(vinyl acetate) and poly(vinyl methyl ketone) may also be used as secondary polymers in the PVDF powder coatings made by the co-coagulation process.

PVDF is produced by emulsion polymerization. The result of PVDF emulsion polymerization is a latex. Generally, in order to make a PVDF powder, the PVDF latex resulting from the emulsion polymerization is coagulated, dried in a spray drier and milled to a desired particle size distribution. The invention, however, incorporates the PVDF latex directly after emulsion polymerization which is then co-coagulated with a compatible thermoplastic latex, such as latexes of the polyalkyl methacrylates and other thermoplastic polymers discussed above. The co-coagulation process provides for an agglomerate size of PVDF much smaller than when PVDF agglomerate is prepared directly from emulsion polymerization and the PVDF is more evenly distributed in the co-coagulation agglomerate because of the partition of acrylic polymers.

The invention comprises the following steps which will be discussed in greater detail herein.

1. Blending of PVDF latex, resulting directly from emulsion polymerization, with a compatible thermoplastic polymer latex, preferably a polyalkyl methacrylate latex, such as PMMA or copolymers comprising PMMA.
2. Adding a coagulant to co-coagulate the PVDF latex and compatible thermoplastic polymer latex, thereby forming a precipitate comprising PVDF and compatible thermoplastic polymer.
3. Separation of the precipitate from the latex fluid, by methods such as filtration.
4. Drying the precipitate, preferably by spray drying, to form a powder coating composition. Pigments, grinding aids or other additives, such as chemicals helpful in coating formation (e.g. flow promoters) may be added before the co-coagulation occurs, and the filtered particulate may be ground to form the powder coating composition.

The PVDF latex and compatible thermoplastic polymer latex, such as polyalkyl methacrylate latex, are formed by emulsion polymerization. Thermoplastic polymer latexes are commercially available. Thermoplastic polymer latexes can also be designed by emulsion polymerization to meet performance requirements. Latexes of PMMA or latexes of copolymers comprising more than about 65% methyl methacrylate and up to about 35% ethyl methacrylate or butyl methacrylate are particularly useful for the invention, and latexes of PMMA are discussed herein to illustrate the invention.

The PVDF latex and the compatible thermoplastic polymer latex are blended in a vessel capable of blending two solutions, such as a mixer or reactor, for a period of time sufficient to completely combine the latexes, preferably from about 15 minutes to about 30 minutes.

After the blending is complete, a coagulant is added to the latex blend. The coagulant serves to destabilize the latex blend and causes the precipitation of the co-coagulated PVDF and compatible thermoplastic polymer, such as acrylic polymer like PMMA and the other acrylic polymers discussed herein. Conventional PVDF dispersion paint is prepared from PVDF agglomerate, which is a coagulation product of PVDF latex. After coagulation, the agglomerate is, generally, spray dried, milled and dispersed with pigment in an acrylic solution. Therefore, the uniformity of final PVDF coating made by dispersion depends on the particle size distribution of PVDF agglomerate. PVDF when made by emulsion polymerization and coagulated will agglomerate to a certain particle size, however, when the PVDF and thermoplastic polymer are co-coagulated the particles combine within agglomerated masses and the particle size of the agglomerated mass is similar to that of an agglomerate of PVDF coagulated after emulsion polymerization. Thus, using co-coagulation process to generate agglomerate of PVDF with acrylic particle results in an agglomerate size of PVDF much smaller than coagulated PVDF and, the PVDF is more uniformly distributed by the partition of acrylic particles compared to conventional PVDF dispersion paints. Upon melting during film forming stage, the PVDF and acrylic melt form improved homogeneity over corresponding dispersion coatings. Similarly, solvent removal processes for making PVDF coatings use coagulated PVDF and, accordingly, the co-coagulated blends will also exhibit improved properties and homogeneity compared to coatings made by solvent dispersion.

The co-coagulated PVDF and compatible thermoplastic polymer is a blend, as there is no thermodynamic interaction between the molecules during the blending step. When the PVDF/compatible thermoplastic polymer co-coagulated blend is, as a powder coating composition, applied to a substrate and heated, the polymers become miscible and thermodynamically interact. Because the PVDF and compatible thermoplastic polymer are co-coagulated in the form of a blend having greater homogeneity arising from the proximity of the PVDF and thermoplastic polymer in the agglomerated cocoagulant, the relatively smaller PVDF agglomerate size and partition of the PVDF, the time to reach a homogeneous miscible polymer blend upon heating will depend upon the volume of material, but is short compared to coatings prepared by other processes. For example, at 260° C., a miscible polymer of PVDF blend and compatible thermoplastic coating can be achieved by the use of powders made through co-coagulation in a time period of up to about 15 minutes.

The coagulant may be added to the same vessel where the blending occurs, or the latex blend may removed from the vessel and coagulant added to the latex blend in a separate vessel. The type of coagulant used in the present invention will depend on the type surfactant used in the emulsion polymerization of the PVDF and compatible thermoplastic polymer. Emulsion polymerization of PVDF generally involves use of anionic surftacants, such as water soluble fluorosurfactants which may be in the form of a salt of perfluorinated carboxylic acid which have a general formula of $X(CF_2)_n COO^-M^+$, where X is a hydrogen or fluorine, n is an integer from about 6 to about 20, preferably from about 8 to about 12 and $M^+$ is an alkali metal ion and ammonium ion. Generally, when emulsion polymerization is used to form the polyacrylate latex, the surfactant should be of the same class as that used for the PVDF to arrive at the co-coagulated compositions described herein. The surfactant for the polyacrylate latex may be a salt of carboxylic acid or sulfonic acid containing alkali or ammonium cation. The co-coagulation of the PVDF and compatible thermoplastic resins, formulated with the surfactants discussed above, uses inorganic acids, such as nitric acid, hydrochloric acid, sulfuric acid or other inorganic acids as the coagulant.

Pigments, may be included in the coating composition. Particularly useful pigments are Arctic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, U.S.A.; block F-2302, blue V-5200, turquoise F-5686, green F-5687, brown F-6109, buff F6115, chestnut brown V-9186, and yellow V-9404 available from Ferro Corp., Cleveland , Ohio, U.S.A. and METEOR® pigments available from Englehard Industries, Edison, N.J., U.S.A. The pigments are preferably uniformly dispersed into the latex blend before the co-coagulation step. Additives, such as chemicals helpful in coating formation or flow promoters, including Lanco ™

Flow P10 available from Lubrizol, Wickliffe, Ohio, U.S.A. and MODAFLOW® Powder available from Solutia, St. Louis, Mo., U.S.A. may be included during the co-coagulation process or added to the powder coating compositions prior to application to a substrate. When the dried precipitate is ground, the flow promoter may be added, and blended with the ground powder.

The process described herein provides for several advantages over other processes. The process of the invention is less time consuming and requires fewer resources than other processes for producing PVDF-based powder coating compositions, such as cryogenic processing and other grinding methods. As a result, the process is less expensive to operate and, accordingly, the resulting powder composition will have a lower price than powders made by other processes. The process also provides for a powder coating composition that is more homogeneous than other powder coating compositions and that has better physical properties.

The powder coating compositions comprising PVDF and compatible thermoplastic polymer made by the co-coagulation process can be applied to a substrate by any suitable means for achieving an even distribution of the particles. In particular, the powder can be applied by electrostatic spray application apparatus, whereby charged particles are sprayed on oppositely charged substrates. Other useful application techniques include, but are not limited to, cloud chambers, fluidized beds and the like. Such techniques will be understood by one skilled in the art and need not be described further.

The co-coagulation process provides a homogeneous blend of PVDF and compatible thermoplastic polymer, such as the acrylic polymers like the polyalkyl methacrylate, discussed herein. Also, the polymers are in intimate contact in the blend. Upon application and heating of the coated substrate, the PVDF and secondary polymer become miscible and form a miscible polymer blend in short duration.

EXAMPLE

The present invention is exemplified with respect to a coating composition comprising PVDF and PMMA. The example is not meant to be limiting as to the combinations of PVDF with thermoplastic polymers useful for the present invention. It should be recognized by one skilled in the art that PVDF can be blended with any compatible thermoplastic polymer, including the polyalkyl methacrylates discussed herein, through the co-coagulation process to arrive at a powder coating composition with superior properties.

Example 1

Methyl methacrylate was extracted three times with equal volumes of 0.5% sodium hydroxide solution to remove hydroquinone inhibitor. The monomer was then washed with deionized water five times and used immediately in polymerization.

The polymerization was carried out in a stirred 1-liter glass dettle fitted with a water-cooled reflux condenser and placed on a heating mantle. 600 grams of deionized water, 8 grams of sodium dodecylsulfate and 10 grams of chain transfer agent, diethylmalonate, were charged to the reactor and heated with stirring to 85° C. Next, 39.0 grams of 10% ammonium persulfate solution was added. After 115 minutes, monomer feed was started. Increments of about 20 milliliters of methyl methacrylate were added with a dropping funnel every 2 to 4 minutes, for a total time of about 30 minutes. A temperature increase of 1 ° C. to 3° C. was experienced with each incremental addition of methyl methacrylate. After heat of polymerization was fully absorbed and the temperature decreased to 85° C., the next methyl methacrylate addition was made. After a total of 250 grams of methyl methacrylate was added, the reactor was heated to 100° C., held for 2 minutes, and cooled to room temperature to form PMMA latex. The 10 latex size was about 0.0511 microns.

300 grams of HYLAR® MP6 PVDF latex, available from Ausimont USA, Inc., Thorofare, N.J., USA, having a solid content of 24.85%, was placed in 800-millimeter plastic beaker along with 95 grams of the PMMA latex having a solid content of 33.66% made by the procedure described above. The mixture was stirred slowly for 10 minutes. Approximately 11 grams of coagulating agent, concentrated nitric acid, was added slowly, causing the mixture to coagulate and form a precipitate. About 500 grams of water was added with manual blending. The mixture was then filtered and dried. The resulting solid was ground, using a hammer mill, to a particle size less than about 70 microns. About 2% by weight of MODAFLOW flow modifier from Solutia was blended into the ground powder thus forming the powder coating composition comprising PVDF and PMMA.

The powder coating composition was sprayed electrostatically, using a MPS 1-L (Manual Powder Power System) with a PG-1 gun available from ITW GEMA, Indianapolis, Ind., U.S.A., onto a chromated aluminum substrate having a polarity of about 30 to 40 KV. The sprayed chromated aluminum substrate was then baked at 260° C. for 15 minutes to form a coating film with 3 to 5 mils of thickness.

The coated substrate was subjected to various tests to evaluate the performance of the PVDF-based powder coating. The coated substrate was subjected to adhesion evaluation in accordance with National Coil Coaters Association ("NCCA") Technical Bulletin 4.2.7 (Rev. —June 1996) and American Society of Testing and Materials ("ASTM") standard D 3281-84, and the coating showed excellent adhesion (no tape off upon crossed hatch test). The coated substrate was subjected to impact resistance evaluation in accordance with NCCA Technical Bulletin 4.2.6 (Rev. 1 —June 1996) and ASTM standard D 2794-93, and the coating showed no damage upon direct or reverse impact at 80 in-lbs. Also, the coating exhibited O-T bending resistance as determined by evaluation under NCCA Technical Bulletin 4.2.7 (Rev. 1 —June 1996), and ASTM standard D 3281-84. NCCA Technical Bulletins 4.2.7 (Rev. 1—June 1996) and 4.2.6 (Rev. 1—June 1996), and ASTM standards D 3281-84 and D 2794-93 are incorporated herein by reference.

What is claimed is:

1. A process for making a powder coating composition comprising the steps of a) mixing polyvinylidene fluoride ("PVDF") latex with a thermoplastic polymer latex to form a latex blend, b) dispersing pigment into the latex blend, c) adding coagulant to said latex blend to co-coagulate said PVDF latex and said thermoplastic latex to form a precipitate wherein the PVDF and thermoplastic polymer are combined within agglomerated masses, d) separating the precipitate and e) drying the precipitate to obtain a powder coating composition.

2. The process of claim 1 comprising the additional step of grinding the filtered precipitate after drying.

3. The process of claim 1 wherein said separating step (c) comprises filtration.

4. The process of claim 1 comprising the additional step of adding grinding aids.

5. The process of claim 1 comprising the additional step of adding flow promoters.

6. The process of claim 1 wherein said PVDF latex is a homopolymer of vinylidene fluoride.

7. The process of claim 1 wherein said PVDF latex comprises more than about 80% vinylidene fluoride and up to about 20% hexafluoropropylene.

8. The process of claim 1 wherein said thermoplastic polymer latex comprises an acrylic polymer.

9. The process of claim 1 wherein said thermoplastic polymer latex comprises polymethyl methacrylate ("PMMA").

10. The process of claim 9 wherein said thermoplastic polymer latex further comprises up to about 35% ethyl methacrylate or butyl methacrylate.

11. The process of claim 1 wherein said thermoplastic polymer latex is selected from the group consisting of poly(ethyl acrylates), poly(vinyl acetate) and poly(vinyl methyl ketone).

12. The process of claim 1 wherein said coagulant is an inorganic acid.

13. The process of claim 12 wherein said inorganic acid is selected from the group consisting of nitric acid, hydrochloric acid and sulfuric acid.

14. A powder coating composition comprising co-coagulated PVDF and thermoplastic polymer and pigment wherein the PVDF and thermoplastic polymer are combined within agglomerated masses.

15. The powder coating composition of claim 14 wherein said PVDF is a homopolymer of vinylidene fluoride, or a copolymer comprising more than about 80% vinylidene fluoride and up to about 20% hexafluoropropylene.

16. The powder coating composition of claim 14 wherein said thermoplastic polymer comprises PMMA.

17. The powder coating composition of claim 16 wherein said thermoplastic polymer further comprises up to about 35% ethyl methacrylate or butyl methacrylate.

18. A process for coating a substrate comprising the steps of a) providing a substrate material, b) providing the powder coating composition of claim 1, c) providing means for applying said coating composition to said substrate, d) applying said coating composition to said substrate, e) heating said substrate to liquify said powder coating composition thereby forming a miscible polymer blend and f) cooling said substrate to obtain a coated substrate.

19. The process of claim 18 wherein said means for applying the coating composition is selected from the group consisting of electrostatic spray, could chambers and fluidiized beds.

20. A substrate coated with the powder coating composition of claim 14.

21. The process of claim 1 wherein the agglomerated masses comprise from about 50% to about 90% PVDF and from about 10% to about 50% polyalkyl methacrylate.

22. The product of claim 14 wherein the agglomerated masses comprise from about 50% to about 90% PVDF and from about 10% to about 50% polyalkyl methacrylate.

* * * * *

UNITED STATES PATENT AND TRADEMARK OFFICE
CERTIFICATE OF CORRECTION

PATENT NO. : 6,340,720 B1 Page 1 of 1
DATED : January 22, 2002
INVENTOR(S) : Lin et al.

It is certified that error appears in the above-identified patent and that said Letters Patent is hereby corrected as shown below:

<u>Title page,</u>
Item [54], line 2, replace "POWER" with -- POWDER --.

Signed and Sealed this

Twenty-third Day of April, 2002

Attest:

Attesting Officer

JAMES E. ROGAN
*Director of the United States Patent and Trademark Office*